Jan. 18, 1966 | I. K. DORTORT | 3,230,395

INVERSE FUNCTION GENERATOR

Original Filed Jan. 17, 1963

INVENTOR.
ISADORE K. DORTORT

BY

OSTROLENK, FABER, GERB & SOFFEN
ATTORNEYS

United States Patent Office 3,230,395

Patented Jan. 18, 1966

3,230,395
INVERSE FUNCTION GENERATOR

Isadore K. Dortort, Philadelphia, Pa., assignor to I-T-E Circuit Breaker Company, Philadelphia, Pa., a corporation of Pennsylvania Original application Jan. 17, 1963, Ser. No. 252,120. Divided and this application Aug. 26, 1963, Ser. No. 304,479
6 Claims. (Cl. 307—88.5)

This application is a division of my copending U.S. application (C-1128) Serial No. 252,120, filed January 17, 1963, entitled, Resistance Measuring Circuit for Electrochemical Cells, and assigned to the assignee of the present invention, which is incorporated herein as a part of the present specification. This application in particular relates to an electrical function converting circuit and more specifically relates to a novel electrical circuit wherein an output current is provided as an inverse function of an input current.

Inverse function generators have use in many general applications in computers and the like and also have utility as an inverse amplifier output for devices such as set forth in the aforementioned U.S. pending application Serial No. 252,120. The novel inverse function generator of the present invention is provided by a novel circuit in which an output load is fed at the output of a bridge-type connection of Zener diodes and resistors. During inverse operation, current flow from the resistive branches is opposed or "bucked down" by spill-over current from the Zener diodes to obtain a current in the load which is the inverse of the input current.

Accordingly, a primary object of this invention is to provide a novel, simply arranged inverse function generator.

Another object of this invention is to provide an inverse function generator which has a minimum number of components.

A further object of this invention is to utilize the spill-over current characteristic of a Zener diode in an inverse function generator.

These and other objects of this invention will become apparent from the following description when taken in connection with the drawings, in which.

Figure 1:
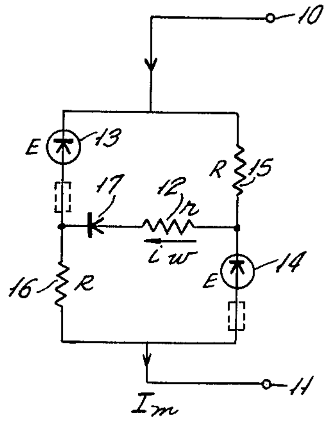
FIGURE 1 shows a circuit diagram of a first embodiment of the invention.

Referring first to FIGURE 1, the circuit shown therein has a pair of input terminals 10 and 11 which are connected to a suitable source of current $I_m$. The purpose of the circuit is to supply a current $i_w$ to an appropriate output circuit or load such as resistor 12 which is some inverse function $$f\left(\frac{1}{I_m}\right)$$

of $I_m$. The load 12, for example, could be the watt meter coil of my above noted copending application and could have some resistance $r$. The novel circuit then includes the bridge-type connection of Zener diodes 13 and 14 having the same breakover voltages E and resistors 15 and 16 having resistances R. A diode 17 may then be connected in series with resistor 12.

Figure 2:
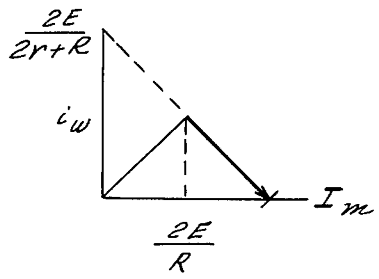
FIGURE 2 illustrates output current as a function of input current for the circuit of FIGURE 1.

The operation of the circuit of FIGURE 1 is best understood by reference to FIGURE 2. Referring now to FIGURE 2, it is seen that the current $i_w$ increases linearly with the current $I_m$ until the voltage drop across resistors

15 and 16 reach the breakover voltage E of Zener diodes 13 and 14. Assuming that the resistance $r$ of load 12 is negligible compared to resistance R of resistors 15 and 16, this breakover is reached at $$I_m=\frac{2E}{R}$$

Inverse operation then proceeds from this point.

More specifically, as current $I_m$ increases beyond the value $2E/R$, the additional or "spillover" current prefers to take the path through diode 13 (in its reverse direction), resistor 12 and diode 14 to the resistive path of resistors 15 and 16. This, therefore, causes the forward current flow established through load 12 and diode 17 to be reduced to the extent of such spillover currents. Therefore, the current $i_w$ in FIGURE 2 decreases with increasing $I_m$ according to the function $$i_w=\frac{2E}{R}-I_m$$

where the value $r/R$ is negligible.

When $i_w$ becomes zero, diode 17 prevents reversal of current through load 12 if this is necessary in the particular application.

It will be noted that a very linear relation is obtained in the device of FIGURES 1 and 2. Where a non-linear but inverse arrangement is desirable, this can be obtained through the use of an additional Zener diode branch in the circuit as shown in FIGURE 3 where components similar to those of FIGURE 1 are given similar identifying numerals.

Figure 3:
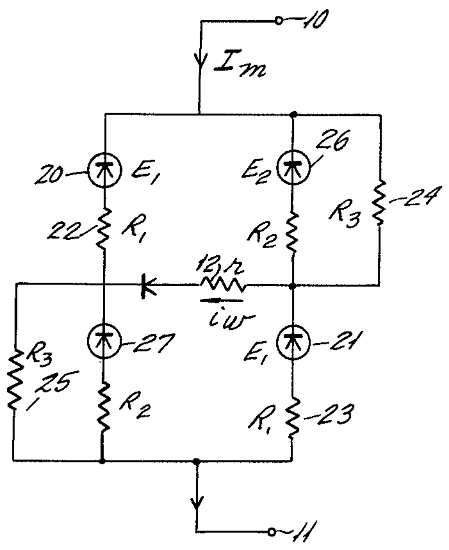
FIGURE 3 shows a circuit diagram of a second embodiment of the invention.

In FIGURE 3, Zener diodes 20 and 21 are provided similar to diodes 13 and 14 of FIGURE 1 and have a breakover voltage $E_1$, and are connected in series with resistors 22 and 23 respectively which each have a resistance $R_1$. Resistors 24 and 25 are also provided, each having a resistance $R_3$, and serving the function of resistors 15 and 16 of FIGURE 1. An additionl branch is then provided of Zener diodes 26 and 27 and their respective series connected resistors 28 and 29 having the same resistance $R_2$. Diodes 26 and 27 each have a breakover voltage $E_2$ which is higher than $E_1$.

Figure 4:
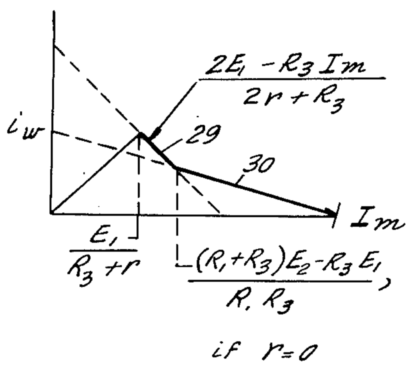
FIGURE 4 illustrates output current as a function of input current for the circuit of FIGURE 3.

Referring now to FIGURE 4, the circuit of FIGURE 3 begins its inverse operation only after the current $I_m$ reaches a value $$\frac{E_1}{R_{3+r}}$$

and diodes 20 and 21 break down as in the case of FIGURE 1. Thereafter, inverse operation proceeds with the current $i_w$ changing according to the relation $$i_w=\frac{2E_1-R_3I_m}{2r+R_3}$$

again as in the case of FIGURE 1. However, in the circuit of FIGURE 3, once the voltage drop on resistors 24 and 25 reach the value $E_2$, the inverse functional relation between $i_w$ and $I_m$ changes from segment 29 to segment 30 in FIGURE 4.

For purposes of simplicity, if the value $r$ is negligible, this changeover occurs when $$I_m=\frac{(R_1+R_3)E_2-R_3E_1}{R_1R_3}$$

After this point, the current $i_w$ changes as follows:

$$i_w=\frac{E_1+E_2R_3/(R_2+R_3)-\frac{1}{2}\left(\frac{R_2R_3}{R_2+R_3}-R_1\right)I_m}{\frac{1}{2}R_1+r+\frac{\frac{1}{2}R_2R_3}{R_2+R_3}}$$

It will be obvious that additional steps can be used to further shape the desired functional relation.

Although this invention has been described with respect to its preferred embodiments, it should be understood that many variations and modifications will now be obvious to those skilled in the art, and it is preferred therefore that the scope of this invention be limited not by the specific disclosure herein, but only by the appended claims.

The embodiments of the invention in which an exclusive privilege or property is claimed are defined as follows:

1. An inverse function generator comprising a source of current having a first and second terminal, a load having a first and second terminal to be energized by some predetermined inverse function of the current of said source, a first and second Zener diode having respective anode and cathode terminals, and a first and second impedance means having respective first and second terminals; said anode terminal of said first Zener diode and said first terminal of said first impedance means being connected to said first terminal of said source of current; said cathode terminal of said second Zener diode and said second terminal of said second impedance means being connected to said second terminal of said source of current; said cathode terminal of said first Zener diode and said first terminal of said second impedance means being connected to said first terminal of said load; said anode terminal of said second Zener diode and said second terminal of said first impedance means being connected to said second terminal of said load, the current through said load linearly increasing from zero toward a peak value and decreasing from said peak value to zero as current flow from said first to said second terminals of said source of current increases.

2. The device as set forth in claim 1 wherein said first and second impedance means are comprised of resistors.

3. The device as set forth in claim 1 which further includes diode means; said diode means being connected in series with said first and second terminals of said load and having a forward conduction direction in opposition to the forward conduction direction of said first and second Zener diodes.

4. The device as set forth in claim 1 which further includes diode means; said diode means being connected in series with said first and second terminals of said load and having a forward conduction direction to permit current flow through said load from said first terminal to said second terminal.

5. The device as set forth in claim 1 which further includes a third and fourth Zener diode; said third and fourth Zener diodes being connected in parallel with said first and second impedance means respectively and having a breakover voltage higher than the breakover voltage of said first and second Zener diodes respectively 6. The device as set forth in claim 1 wherein each of said Zener diodes is respectively connected directly in series with a resistor means.

References Cited by the Examiner

UNITED STATES PATENTS 3,139,562 6/1964 Freeborn ---------- 307—88.5

FOREIGN PATENTS 598,597 5/1960 Canada.

355,816 9/1961 Switzerland.

ARTHUR GAUSS, *Primary Examiner.*

JOHN W. HUCKERT, *Examiner.*